J. E. HAGLER.
MACHINE FOR CATCHING AND GATHERING BOLL WEEVILS.
APPLICATION FILED OCT. 16, 1912.
1,067,651.
Patented July 15, 1913.
3 SHEETS—SHEET 3.
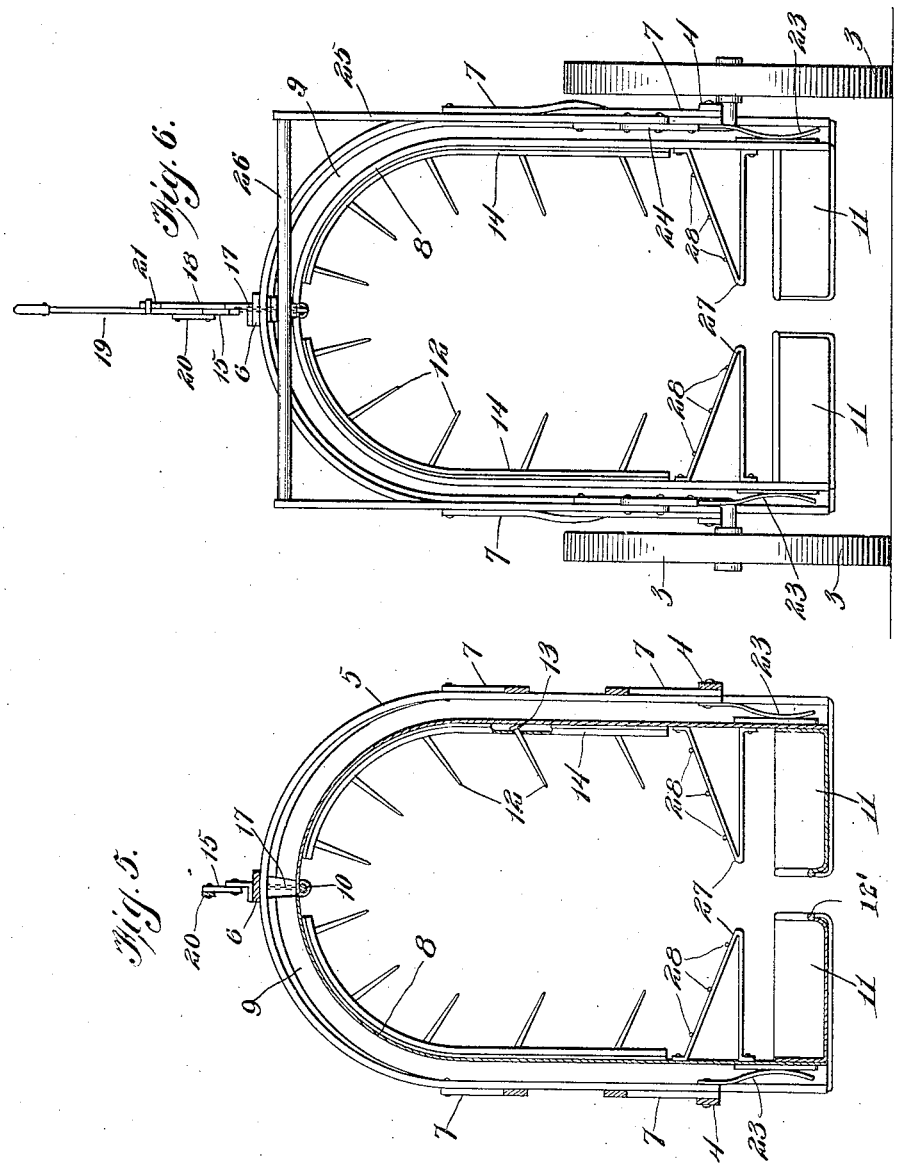
Witnesses
Inventor
J. E. Hagler
By Victor J. Evans
Attorney

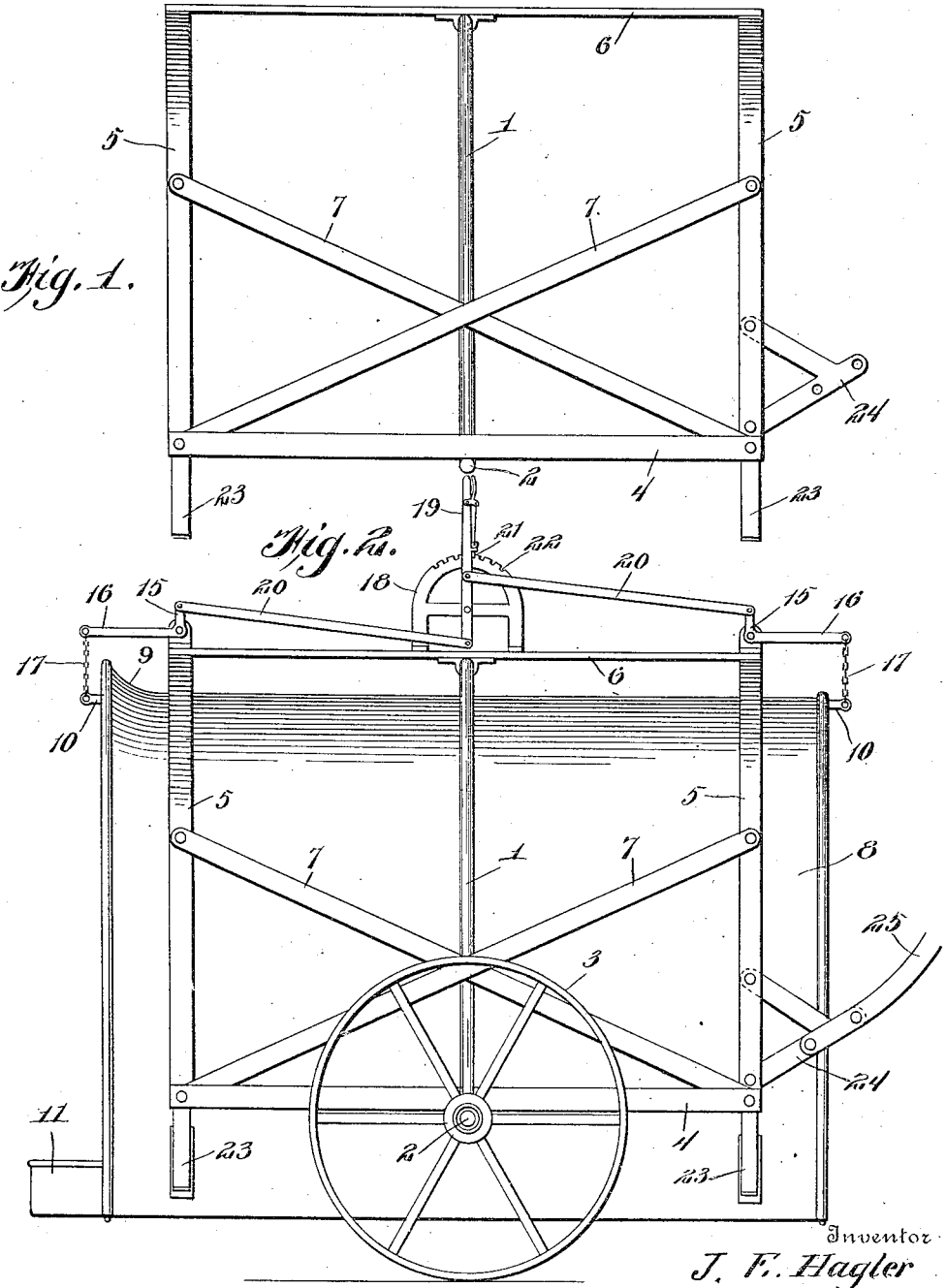

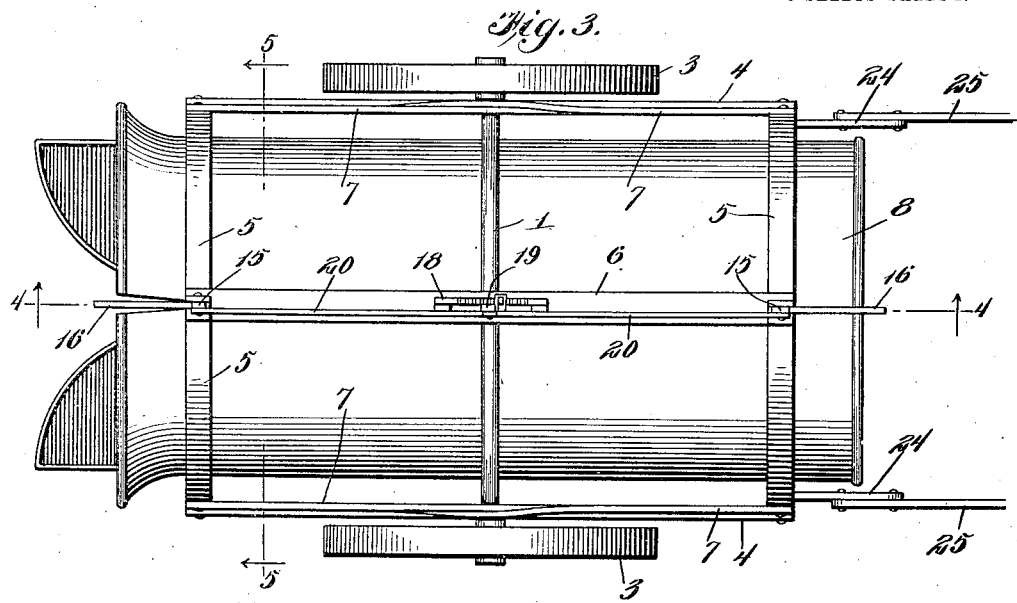
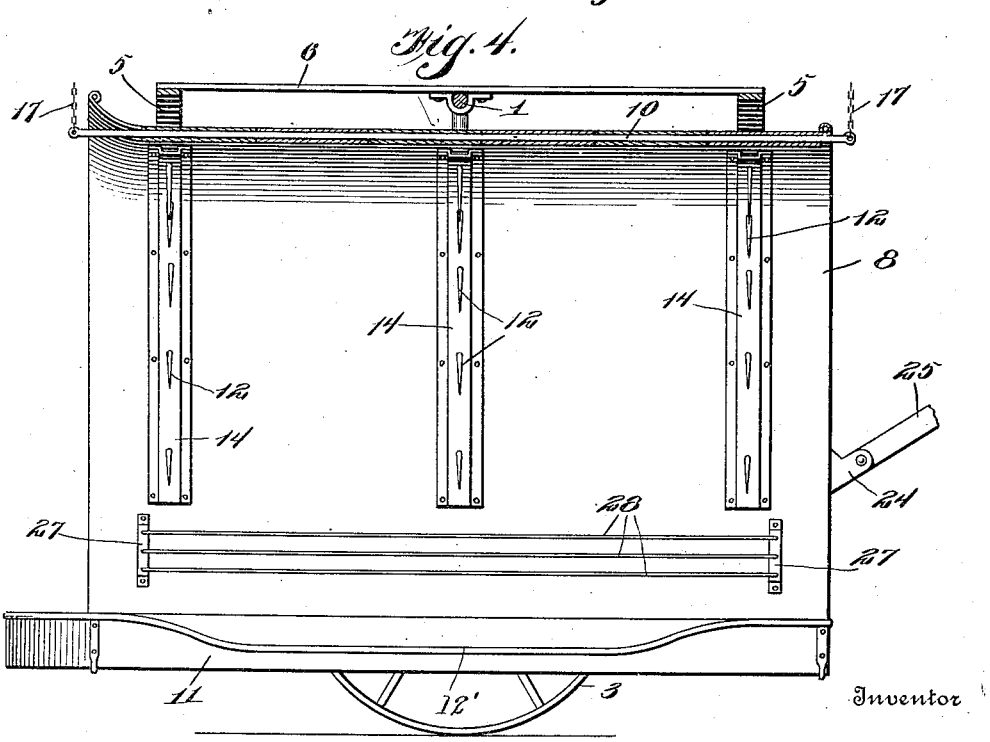

UNITED STATES PATENT OFFICE.

JOHN E. HAGLER, OF SAMANTHA, ALABAMA.

MACHINE FOR CATCHING AND GATHERING BOLL-WEEVILS.

1,067,651. Specification of Letters Patent. Patented July 15, 1913.

Application filed October 16, 1912. Serial No. 726,104.

*To all whom it may concern:*

Be it known that I, JOHN E. HAGLER, a citizen of the United States, residing at Samantha, in the county of Tuscaloosa and State of Alabama, have invented new and useful Improvements in Machines for Catching and Gathering Boll-Weevils, of which the following is a specification.

This invention relates to machines for catching and gathering boll weevils, cotton worms and other destructive insects, and it has for its object to produce a simple and improved machine which may be conveniently pushed or drawn along the rows of plants for the purpose of gathering the insects to be subsequently destroyed.

A further object of the invention is to produce a device of the class described comprising hoods having engaging beaters and insect receiving and gathering troughs, in combination with a carrying frame and means of simple and improved construction for adjustably supporting the hoods.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation of the frame of the improved machine, the hood having been detached. Fig. 2 is a side elevation of the machine complete. Fig. 3 is a top plan view. Fig. 4 is a longitudinal sectional view taken on the line 4—4 in Fig. 3. Fig. 5 is a transverse sectional view taken on the line 5—5 in Fig. 3 showing the gathering troughs slightly separated as they would appear when the troughs, in operation, are forced apart by engagement with a plant. Fig. 6 is an end elevation showing the troughs slightly separated, as in Fig. 5.

Corresponding parts in the several figures are denoted by like characters of reference.

1 designates an arch axle having spindles 2 on which ground wheels 3, 3 are supported for rotation. The axle 2 supports a frame structure which has been shown as comprising longitudinal side bars 4 that rest on the spindles adjacent to the inner ends of the wheel hubs, said side bars being connected at their ends by means of arches 5, similar to the axle arch in size and shape. The arches 5 are connected with the axle arch 1 by means of a longitudinal top bar 6 which serves to support the frame structure with respect to the axle. The front and rear end arches 5 are also connected together by means of diagonal braces 7 that combine with the arches 5, the side bars 4 and the top bar 6 to form a light, rigid and strong frame structure.

The casing of the machine consists of a tunnel-shaped structure comprising two members or hoods 8, the front ends of which are flared, as shown at 9, so as to admit the plants that are to be operated upon. The upper incurved ends of the hoods 8 are hingedly connected with a longitudinal rod or shaft 10 which is supported from the top bar 6 of the frame structure by means to be presently more fully described. Supported adjacent to the lower ends of the hoods 8, and extending within the casing, are troughs 11, between the opposed edges of which the stalks of the plants that are to be operated upon will be admitted; the front ends of said troughs are rounded or curved, as shown, in order to permit the stalks of the plants to enter between them without danger of being bruised or injured; the opposed inner side walls of the troughs are recessed and beaded, as shown at 12' in Figs. 4 and 5, to avoid injuring the stalks of the plants and to permit the leafy or bushy portions thereof to overhang the troughs as far as possible.

Mounted on the inner faces of the hoods 8 are several rows or series of beaters 12 consisting of rods or spikes having heads 13 (see Fig. 5), said spikes being driven through strips 14 of sheet metal or other suitable material which are subsequently secured on the inner faces of the hoods, as shown, thereby confining the heads of the spikes in such a manner that the latter will project inwardly within the casing and yet be loosely supported in such a manner that they may move or vibrate freely and yield slightly to the impact of the plants when the machine is in operation, thereby avoiding injury to the plants.

Supported on the top bar 6 of the casing adjacent to the ends thereof are bell cranks 15 having long arms 16 from which the casing is suspended by means of flexible members, such as chains 17, that connect the rod or shaft 10 with the long arms 16. Supported on the top bar 6 intermediate the ends thereof is a lever stand 18 upon which is fulcrumed a hand lever 19, the arms of which are connected by means of links 20 with the short arms of the bell cranks 15, the arrangement being such that by manipulating the hand lever the bell cranks will be simultaneously actuated to raise or lower the casing of the machine, according to the direction in which the hand lever is operated. The hand lever is provided with a stop member 21 adapted to engage notches 22 in the lever stand for the purpose of retaining the said lever and parts actuated thereby in adjusted position.

Secured on the arch members 5 are springs 23 that bear against the outer faces of the hoods 8 to force the lower ends of said hoods inward in the direction of the plants that are being operated upon. The frame structure is also provided with rearwardly extending brackets 24 with which a handle is suitably connected, said handle comprising side members 25 that are connected together by a cross bar 26, thereby enabling the machine to be conveniently pushed along.

The hoods 8 are provided at the ends thereof with inwardly extending arms or brackets 27; these brackets, being disposed adjacent to the front and rear ends of each hood, are connected together by longitudinal wires 28 that extend lengthwise of the troughs 11, being suitably spaced above said troughs to protect the leaves of the plants from contact with the contents of the receptacles. It will be observed that the brackets 27 which support the wires 28 are spaced above the troughs so as not to interfere with the removal of said troughs when desired.

When the machine is in operation, adhesive or sticky material, preferably of a description which is noxious to insect life, such as coal tar, is spread in the troughs 11, and the machine is then pushed along the row of infested plants. The plants will enter between the hoods, the stalks being accommodated between the troughs 11, and the foliage will be engaged by the beaters 12, whereby the boll weevils, worms and other insects, as well as the infested squares, will become detached and drop into the troughs where they will adhere to the sticky substance, whereby escape of the insects will be prevented. Winged insects that try to escape will strike the hoods and be deflected into the troughs. At proper intervals, the contents of the troughs may be scraped out and destroyed, after which the troughs may be recoated for further use. The flaring shape of the front ends of the hoods will permit the plants to enter into the casing without injury, and injury to the stalks will likewise be avoided, owing to the rounded shape of the front ends of the troughs. It will, of course, be understood that the tendency of the troughs is to move or swing in the direction of one another, that is to say, in the direction of the longitudinal medial line of the machine and in the direction of the stalks of the plants. It is by contact with the stalks of the plants that the troughs are moved in an outward direction or apart from each other just sufficient to admit of the passage of the stalks, thus avoiding any open space beyond the mere thickness of the stalks through which the insects might drop on the ground instead of being caught in the troughs. It will also be understood that the casing being loosely suspended by means of the chains 17, will adapt itself to irregularities in the row of plants and that in its passage from one plant to another it will be subjected to a vibration which is effective in shaking without injuring the leaves of the plants to remove adhering insects, as well as diseased portions of the plant. The beaters being loosely mounted will be agitated by the movement of the machine and will effectively engage the foliage of the plants without injury to the latter. The spring 23 will cause the hoods to close upon the plants as tightly as may be desired or as may be found necessary for effective operation. The side members of the handles are curved upwardly, as shown, so as to be readily grasped by the operator or operators who may walk on either side of the row of plants.

Having thus described the invention, what is claimed as new, is:—

1. In a device of the class described, a wheel supported arched axle, a frame structure supported thereon and comprising a pair of arches similar to the axle arch and connecting means including a top bar, bell cranks fulcrumed on the top bar, a plant engaging casing suspended from said bell cranks, and means for simultaneously actuating the bell cranks to effect vertical adjustment of the casing.

2. In a device of the character described, a wheel supported arched axle, a frame structure supported thereon and including arches similar to the axle arch, and connecting means including a top bar, a plant engaging casing comprising a pair of hoods and a rod with which said hoods are hingedly connected, said hoods being provided with inwardly extending beaters and with troughs adjacent to their lower edges, and springs supported by the frame structure and engaging the casing hoods to force said hoods in the direction of one another.

3. In a device of the character described, a wheel supported arched axle, a frame structure supported thereon, and a plant engaging casing supported by the frame structure, said casing comprising a pair of hoods and a rod with which said hoods are hingedly connected, strips secured interiorly on the faces of the hoods, and beaters extending through the strips and having heads loosely confined between the strips and the walls of the hoods.

4. In a device of the class described, a supporting frame including a plurality of arches, a tunnel-shaped plant engaging casing comprising a rod and hood members hingedly connected therewith, flexible suspending means connecting the rod with the supporting frame, springs supported by the frame and exteriorly engaging the hoods, and troughs interiorly supported adjacent to the lower edges of the hoods, said troughs being rounded at their front ends and said hoods being flared at their front ends.

5. In a device of the class described, a supporting frame, a plant engaging casing supported thereby and including pivotally supported hoods, beaters associated with the casing and extending inwardly within the same, receptacles supported interiorly on the hoods near their lower ends, brackets secured interiorly on the hoods and spaced above the troughs, and guard wires stretched lengthwise through the casing and connected terminally with the brackets to protect the leaves of the plants from contact with the contents of the receptacles.

In testimony whereof I affix my signature in presence of two witnesses.

JOHN E. HAGLER.

Witnesses:
 M. W. HAMNER,
 S. P. FAUCETT.

---

Copies of this patent may be obtained for five cents each, by addressing the "Commissioner of Patents, Washington, D. C."